US008611536B2

(12) United States Patent
Semple et al.

(10) Patent No.: US 8,611,536 B2
(45) Date of Patent: Dec. 17, 2013

(54) BOOTSTRAPPING AUTHENTICATION USING DISTINGUISHED RANDOM CHALLENGES

(75) Inventors: James Semple, London (GB); Gregory G. Rose, San Diego, CA (US); Michael Paddon, Kellyville (AU); Philip Michael Hawkes, Ashfield (AU)

(73) Assignee: QUALCOMM Incorporated, San Diego, CA (US)

( * ) Notice: Subject to any disclaimer, the term of this patent is extended or adjusted under 35 U.S.C. 154(b) by 1539 days.

(21) Appl. No.: 11/218,885

(22) Filed: Sep. 2, 2005

(65) Prior Publication Data

US 2006/0120531 A1    Jun. 8, 2006

Related U.S. Application Data

(60) Provisional application No. 60/608,305, filed on Sep. 8, 2004.

(51) Int. Cl.
*H04L 29/06* (2006.01)

(52) U.S. Cl.
USPC ............................................. 380/270

(58) Field of Classification Search
USPC ............ 380/44–45, 247–249, 255, 270, 277, 380/279, 286; 713/168–169; 455/410–411, 455/433
See application file for complete search history.

(56) References Cited

U.S. PATENT DOCUMENTS

| | | | |
|---|---|---|---|
| 5,661,806 A * | 8/1997 | Nevoux et al. ................ 380/247 |
| 6,266,525 B1 * | 7/2001 | Peterson ....................... 455/410 |
| 6,584,310 B1 * | 6/2003 | Berenzweig ................. 455/432.1 |
| 6,711,400 B1 * | 3/2004 | Aura ............................... 455/411 |
| 6,745,326 B1 * | 6/2004 | Wary ............................... 713/168 |
| 7,913,096 B2 * | 3/2011 | Leone et al. .................... 713/193 |
| 8,126,148 B2 * | 2/2012 | Chowdhury et al. .......... 380/277 |
| 2002/0094822 A1 * | 7/2002 | Anctil et al. ................... 455/456 |
| 2002/0120844 A1 * | 8/2002 | Faccin et al. ................... 713/168 |
| 2002/0169966 A1 * | 11/2002 | Nyman et al. ................. 713/182 |
| 2003/0101345 A1 * | 5/2003 | Nyberg .......................... 713/170 |
| 2004/0229597 A1 * | 11/2004 | Patel .............................. 455/411 |
| 2005/0278787 A1 * | 12/2005 | Naslund et al. .................. 726/26 |
| 2007/0157022 A1 * | 7/2007 | Blom et al. .................... 713/166 |

FOREIGN PATENT DOCUMENTS

| | | |
|---|---|---|
| DE | 10128300 | 1/2003 |
| JP | 6350598 | 12/1994 |
| JP | 2003530046 | 10/2003 |

(Continued)

OTHER PUBLICATIONS

International Search Report, PCT/US05/032337, International Search Authority, European Patent Office, Feb. 16, 2006.

(Continued)

*Primary Examiner* — Michael S McNally
(74) *Attorney, Agent, or Firm* — Won Tae Kim

(57) ABSTRACT

A communications system and method of bootstrapping mobile station authentication and establishing a secure encryption key are disclosed. In one embodiment of the communications network, a distinguished random challenge is reserved for generation of a secure encryption key, wherein the distinguished random challenge is not used for authentication of a mobile station. The distinguished random challenge is stored at a mobile station's mobile equipment and used to generate a secure encryption key, and a bootstrapping function in the network uses a normal random challenge to authenticate the mobile station and the distinguished random challenge to generate the secure encryption key.

23 Claims, 6 Drawing Sheets

(56) References Cited

FOREIGN PATENT DOCUMENTS

| KR | 20020093016 | 12/2002 |
| KR | 20030019336 | 3/2003 |
| WO | 0014895 | 9/1998 |
| WO | WO 02102103 A2 * | 12/2002 |
| WO | 048638 A | 5/2005 |

OTHER PUBLICATIONS

Written Opinion, PCT/US05/032337, International Search Authority, European Patent Office, Feb. 16, 2006.
International Preliminary Report on Patentability, PCT/US05/032337, International Preliminary Examining Authority, United States, Mar. 13, 2007.

* cited by examiner

US 8,611,536 B2

BOOTSTRAPPING AUTHENTICATION USING DISTINGUISHED RANDOM CHALLENGES

CLAIM OF PRIORITY UNDER 35 U.S.C. §119

This application claims priority to U.S. Provisional Patent Application No. 60/608,305 entitled "BOOTSRAPPING GSM AUTHENTICATION AND DISTINGUISHED RANDS" and filed on Sep. 8, 2004. The disclosure of the above-described filed application is hereby incorporated by reference in its entirety.

BACKGROUND

1. Field

The application relates generally to authentication in cellular communication networks, and more particularly to the derivation of encryption keys for application security.

2. Background

Mobile communication applications generally share a need for authentication of a subscriber (user equipment or mobile station) by a communication server before communication is initiated or a transaction is carried out. One authentication mechanism is based on a secret shared between the communicating entities, and there are a number of authentication protocols that rely on this pre-shared secret.

In a mobile communications network based on the Global System for Mobile Communications (GSM), for example, the identity of a subscriber is authenticated before the subscriber is allowed to access the communications network. In order for a subscriber's mobile station (or user equipment UE) to establish a communication session with a network element, the mobile station authenticates itself to the network element by responding to a random number challenge. The random number challenge and a shared secret key are used to establish a session encryption key for encrypting communication transmissions between the mobile station and the network element.

The communications system features described herein can be implemented in a variety of communications networks requiring authentication and encrypted communication between communicating entities. FIG. 1 is a block diagram of the communication network entities involved in authentication of a subscriber in a GSM network. A subscriber's mobile station 30 comprises a secure IC 32 and mobile equipment (ME) 34 (e.g., a cellular telephone handset). The mobile equipment 34 includes a processor 36 configured to perform authentication functions at the mobile station 30 in conjunction with the secure IC 32.

Stored on the secure IC 32 is subscriber identity and subscription related information, information for performing authentication functions with the communications network, an International Mobile Subscriber Identity (IMSI), preferred language, and IC card identification. The secure IC may be referred to as a SIM card or a smart card. Also stored at the secure IC 32 is a secret key Ki 38 which is used to authenticate the mobile station 30 to a network element 40 of the serving network for access to the network. The secret key Ki 38 is also stored at the mobile subscriber's home network at an authentication center (AuC) 42. The authentication center 42 uses the secret key Ki 38 to generate authentication data specific to the subscriber using the secret key Ki 38, and sends the authentication data to the network element 40.

An authentication and key generation process for mobile station authentication and encrypted communication is illustrated in FIGS. 1-3, wherein FIG. 2 is a flow diagram illustrating a method of authentication and encryption key generation at the mobile station 30, and FIG. 3 is a signal flow diagram illustrating a method of mobile station authentication and encryption key generation in the communications network. In reference to FIG. 3, the mobile station 30 requests a communication session with a network element 40 in a step 102. If the network element 40 does not already have security information stored for that subscriber to authenticate the mobile station 30, the network element 40 sends a request for security information to the authentication center 42 in the mobile station's home network in a step 104. In response to the security information request, the authentication center 42 generates one or more authentication vectors comprising a random number challenge RAND, an expected authentication response XRES, and a encryption key Kc. The expected response XRES and the encryption key Kc are determined based on the RAND and the secret key Ki 38. In a step 108, the authentication center 42 sends the authentication vector(s) (RAND, XRES, Kc) to the network element 40.

The network element 40 selects an authentication vector (RAND, XRES, Kc) to use in authenticating the identity of the mobile station 30 and sends the random challenge RAND of the selected authentication vector to the mobile station 30 in a step 112. Referring to FIG. 2, the mobile station 30 receives the authentication challenge with the challenge RAND in step 112, and computes and sends an authentication response in a step 114. The mobile station 30 also computes a session key in a step 115 using the secret key Ki 38 and RAND.

To produce the response and the session key, the mobile equipment 34 at the mobile station 30 passes the RAND to the secure IC in a step 113. In steps 114 and 115, the secure IC 32 computes a set of one or more values using the received random challenge RAND and the stored secret key Ki. These values generally include an authentication response SRES as shown in step 114. In step 115, the secure IC 32 computes a second value comprising a session encryption key Kc using the received random challenge RAND, the stored secret key Ki 38. In a step 116, the secure IC 32 sends the generated response SRES and the encryption key Kc to the mobile equipment 34 in a step 116. The mobile equipment 34 sends the generated authentication response SRES to the network element 40 in a step 117, and stores the key Kc at the mobile equipment in a step 118. The network element 40 compares the mobile station generated authentication response SRES to the expected response XRES of the selected authentication vector in a step 119. If the authentication parameters do not match, the authentication procedure is terminated. If the parameters do match, the mobile station 30 is considered authenticated in a step 120 and the network element 40 begins communication with the mobile unit using the encryption key Kc in step 122.

GSM authentication and key agreement procedures are subject to replay and cryptanalytic attack. For example, the conventional algorithms used by the GSM system to encrypt communications are weak. Methods have been devised to determine the encryption key Kc and determine the contents of a subscriber's communications. There is therefore a need in the art for a method of improving application security using the current capabilities of deployed mobile stations, especially as mobile communications become used for more sensitive data or require stronger authentication.

SUMMARY

In one aspect, the invention includes a mobile station configured for communicating in a wireless communications network. The mobile station comprises a receiver configured to receive at least one authentication data parameter from the wireless communications network and a memory storing a fixed authentication data parameter. A first processing circuit is configured to generate a first key based on the at least one received authentication data parameter, and to generate a second key based on the fixed authentication data parameter. A second processing circuit is configured to generate a third key using at least the first and second keys.

In another aspect, a mobile element of a wireless communications network is provided. The wireless communications network comprises a plurality of mobile elements and a plurality of network elements communicating with the mobile elements. The mobile element is configured to authenticate itself to the communications network by responding to a challenge value presented to the mobile element by a network element of the communications network during an authentication procedure. Furthermore, the mobile element comprises a memory storing a reserved challenge value that is not used to authenticate mobile elements in authentication procedures between any network element and any mobile element.

In another aspect, the invention includes a method of communication between a mobile station and a communications network element. The method includes selecting an authentication challenge at a network element and transmitting the authentication challenge to a mobile station. The method further includes generating a first value comprising an authentication response at the mobile station using at least the authentication challenge and a stored key; generating a second value at the mobile equipment using at least the authentication challenge and the stored key; generating a third value at the mobile equipment using at least a fourth value different from the authentication challenge and the stored key; and generating a key using at least the second and third values.

In another aspect, a method of creating keys in a communication network that uses a challenge-response authentication procedure comprises reserving at least one challenge value for use in generating session keys for use in communication between mobile units and network elements within the communication network. The reserved challenge value is not used for mobile unit authentication.

In another aspect, a method of generating a key at a mobile station for securing communication between the mobile station and a network element is provided. In this aspect, the method includes receiving an authentication challenge value from a network element at the mobile station and sending the authentication challenge value to a processing circuit. The method further includes generating a first set of one or more values using at least the authentication challenge value, sending at least one value from the first set to the network element for authentication. The method continues by sending a second authentication challenge value to the processing circuit and generating a second set of one or more values using at least the second authentication challenge. A key is generated using at least one value of the first set and at least one value of the second set.

In another aspect, a mobile station in a communications network includes means for receiving an authentication challenge value from the communications network, means for generating a first set of values in response to the received authentication challenge, means for generating a second set of values in response to a distinguished authentication challenge value, and means for generating a key using at least one of the first set of values and at least one of the second set of values.

DETAILED DESCRIPTION

As discussed above, the GSM encryption algorithms A5/1 and A5/2 are subject to attack, and methods have been found to obtain knowledge of an encryption key and thereby obtain unauthorized information from the mobile station 30. Thus, an improved authentication and key generation procedure is herein described, wherein the authentication and key generation procedure is implemented in one embodiment wherein the functions performed by a mobile subscriber's secure IC 32 remain the same as in the procedure illustrated in FIGS. 2-3, but the functions performed by the mobile equipment ME are different. Specifically, embodiments of the authentication and key generation procedure described herein can be implemented in new mobile station terminals using already deployed secure IC's 32, in order to derive keys for use in application security which are not compromised by the weaknesses of the GSM radio interface encryption.

Figure 1:
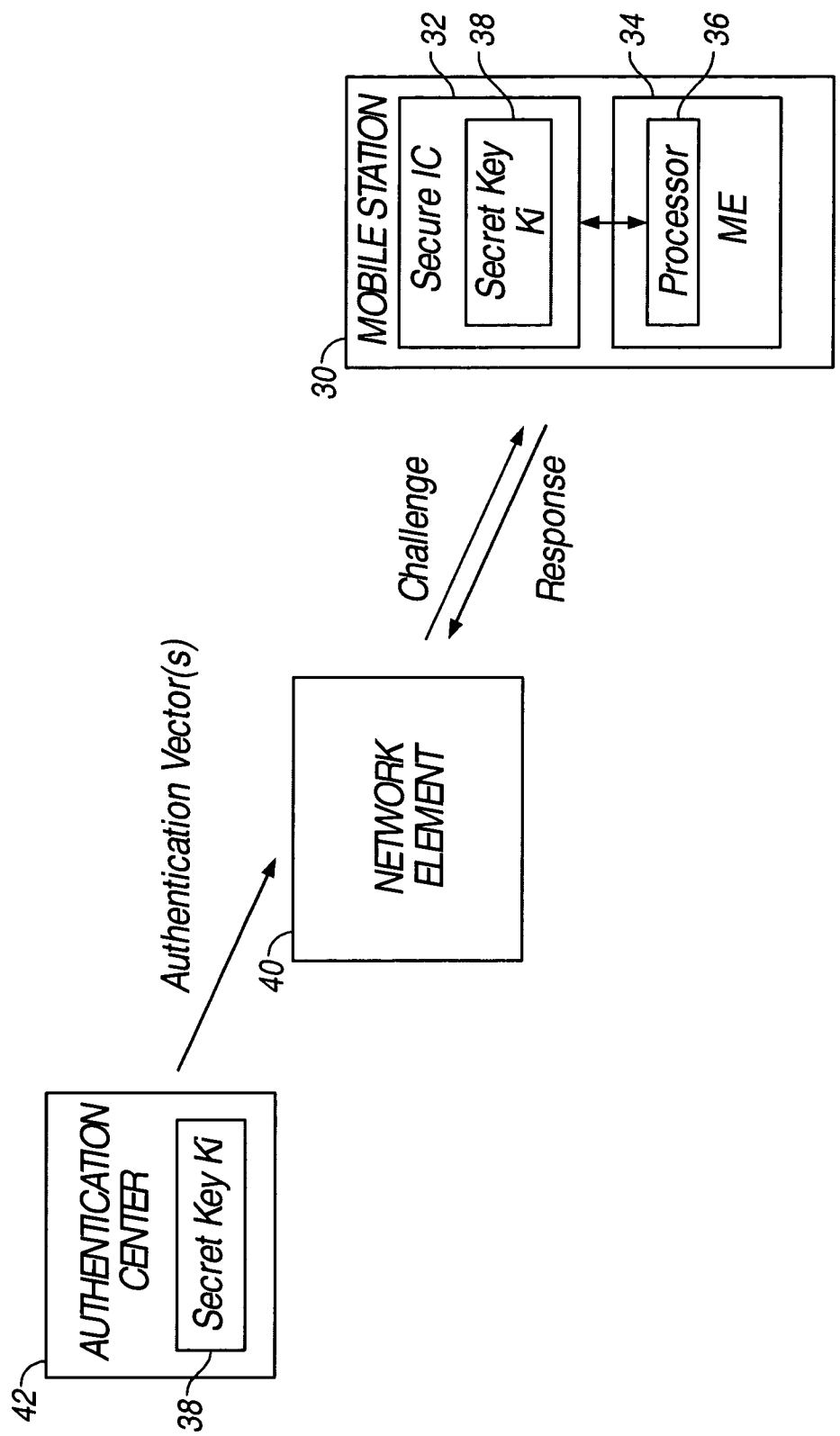
FIG. 1 is a block diagram of the communication network entities involved in authentication of a subscriber for communication in a GSM network.
Figure 3:
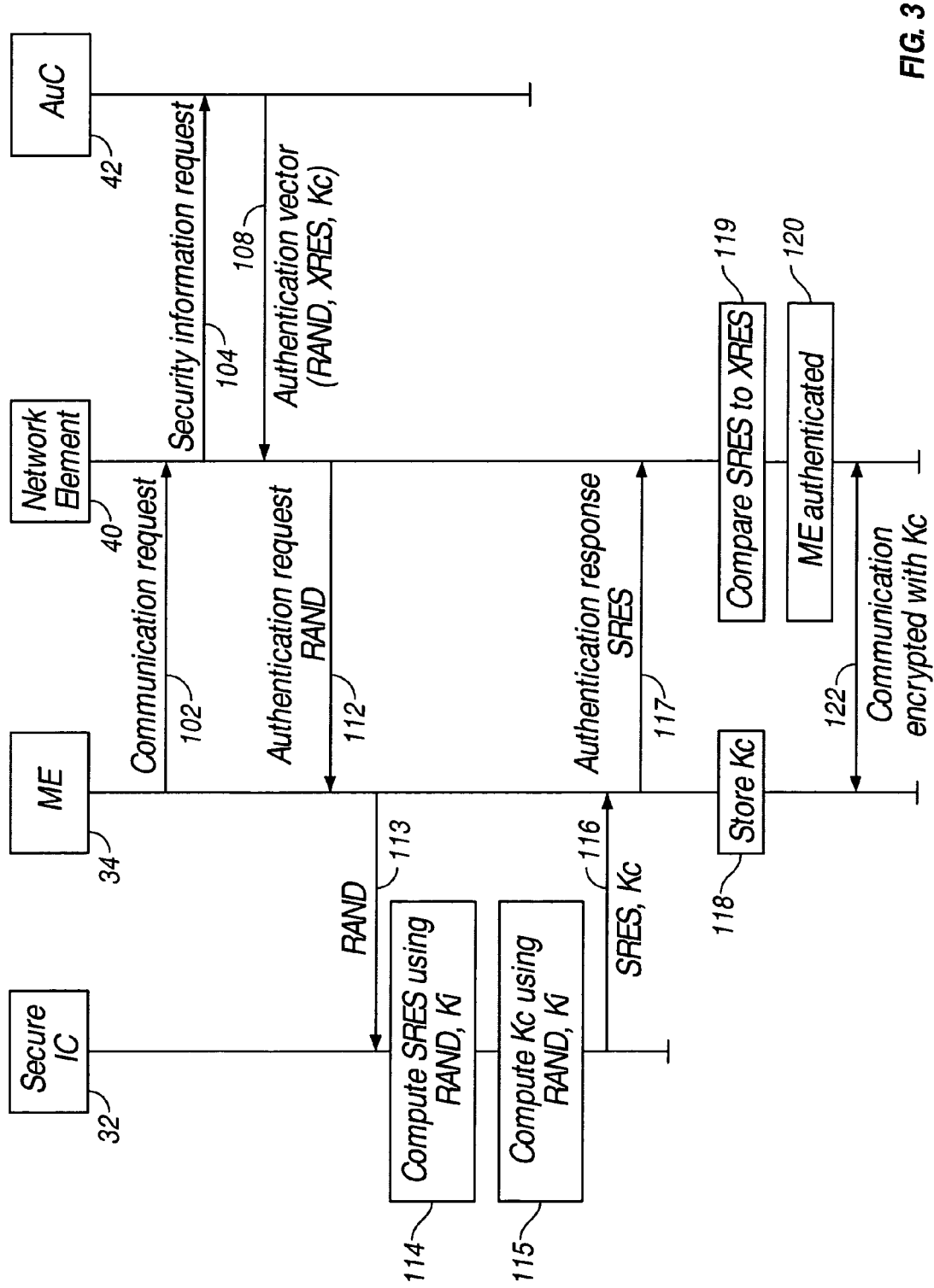
FIG. 3 is a signal flow diagram illustrating an authentication and key agreement procedure for authentication of a subscriber to a network element in GSM.
Figure 4:
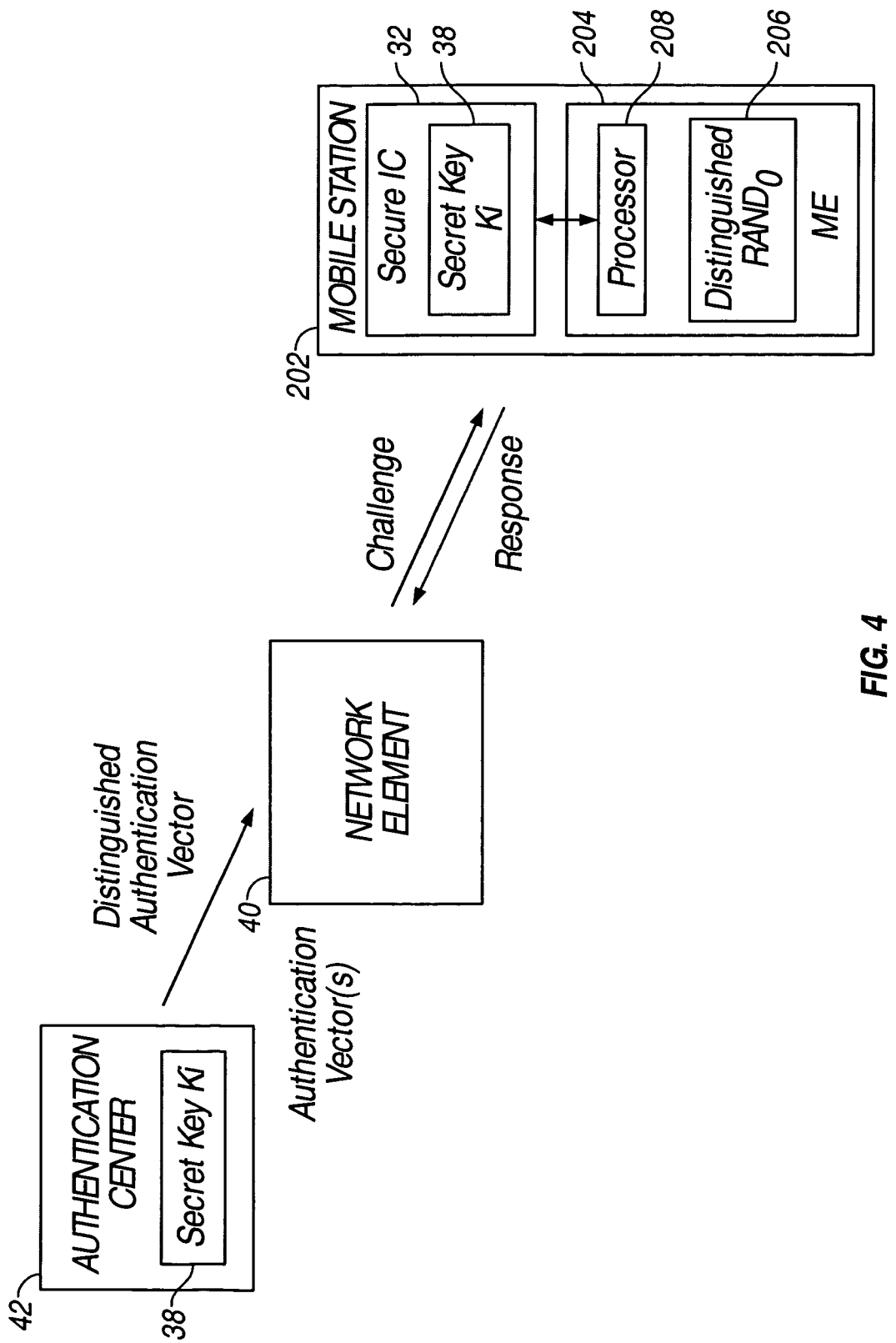
FIG. 4 is a block diagram of one embodiment of the communication network entities involved in authentication of a subscriber using distinguished authentication data.

FIG. 4 is a block diagram of one embodiment of the communication network entities involved in authentication of a subscriber using distinguished authentication data. The communications network illustrated in FIG. 4 comprises a mobile station 202, which is similar to the mobile station 30 of FIG. 1, wherein the mobile station 202 of FIG. 3 comprises the secure IC 32 which stores the secret key 38. However, mobile equipment 204 of the mobile station 202 is different from the mobile equipment 34 of the mobile station 30 of FIG. 1 in that mobile equipment 204 stores distinguished or reserved authentication data in its memory, such as a distinguished random number challenge RAND 206. The mobile equipment 204 also comprises a processor 208.

The mobile equipment 204 uses the distinguished RAND 206 to generate a second set of values in addition to the set of values produced in response to a RAND received from the network as part of an authentication process. The mobile station computes a "distinguished" session key K using values produced from the challenge RAND received from the network and values produced from the distinguished RAND stored in the mobile station. The distinguished RAND has a predetermined fixed value known to the network and the mobile device. It may, for example, have an all-zero value, and is designated herein as $RAND_0$. The authentication center 42 also stores the distinguished RAND so that the network can also compute the distinguished key K. The distinguished key K can be used for a variety of purposes after it is generated, including encrypting or keying a message authentication code in future communications, transactions, or the like. It may be used to secure communications between the mobile station 202 and a network element for applications requiring increased security, such as banking applications, over a variety of bearers such as GPRS, Bluetooth or WLAN. The distinguished RAND is reserved by the system for use in generating the distinguished key K, and is not used for initial authentication procedures, so that neither $RAND_0$ or the signed response to $RAND_0$ ($SRES_0$) are transferred over the wireless communication link.

Figure 5:
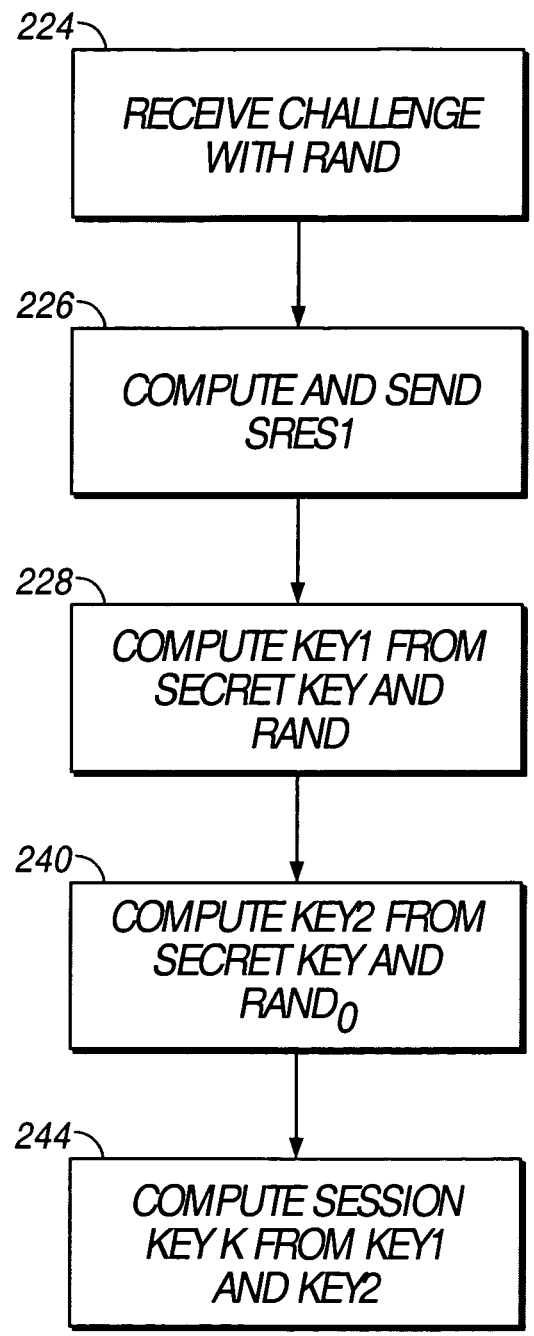
FIG. 5 is a flow chart illustrating one embodiment of an authentication and distinguished key generation process performed at a mobile station using distinguished authentication data.
Figure 6:
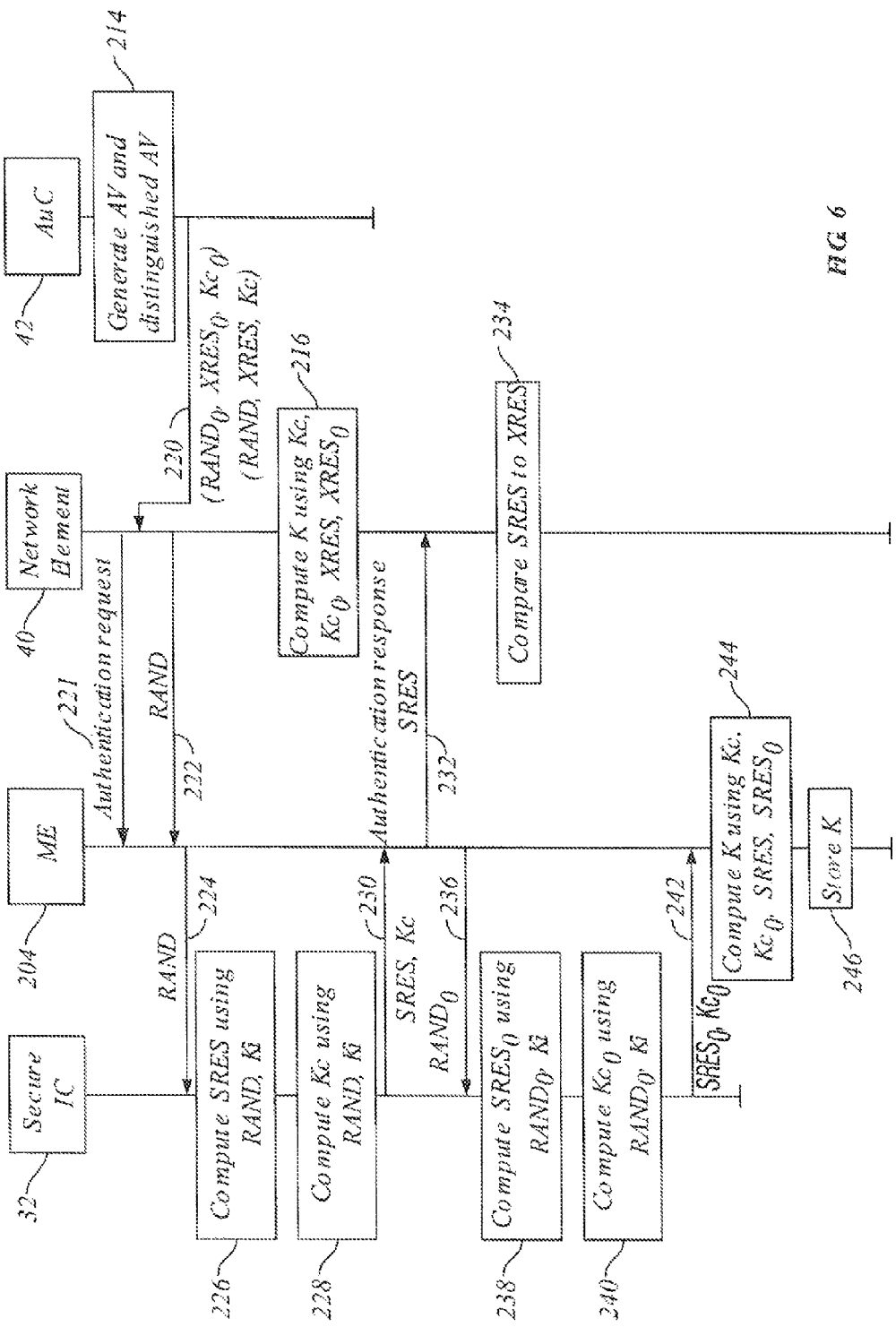
FIG. 6 is a signal flow diagram illustrating one embodiment of a method of establishing a secure communication session between a mobile station and a communications network using distinguished authentication data.

FIGS. 5-6 illustrate an authentication and secure key generation process for the network entities of FIG. 4, wherein FIG. 5 is a flow diagram illustrating one embodiment of a method of authentication and secure key generation at the mobile station 202, and FIG. 6 is a signal flow diagram illustrating one embodiment of an authentication and secure key generation process for establishing secure communication in a network.

In reference to FIG. 6, the network element 40 obtains authentication data specific to the subscriber from the authentication center (AuC) 42 in the subscriber's home network. In a step 214, the authentication center 42 uses a random challenge RAND and the secret key Ki to generate one or more authentication vectors (RAND, XRES, Kc). The authentication center 42 also generates one or more distinguished authentication vectors ($RAND_0$, $XRES_0$, $Kc_0$) using the distinguished random challenge $RAND_0$ 206 and the secret key Ki. In a step 216, the authentication center computes a distinguished session key K using Kc, $Kc_0$, XRES, and $XRES_0$. In one embodiment, the distinguished key K is a hash of Kc, $Kc_0$, XRES, and $XRES_0$. In a step 220, the authentication center 42 sends both the authentication vector(s) and distinguished authentication vector(s) to the network element 40. With this information, the network element can also compute the distinguished key K based on the information provided by the authentication center.

As will be appreciated by those skilled in the art, the distinguished key K may be generated based on a plurality of combinations of values and is not limited to those described herein. For example, the distinguished key K may be generated based on RAND and $RAND_0$ in addition to or in place of Kc, $Kc_0$, XRES, and $XRES_0$. Also, a variety of variants may be used to provide the network element with the information necessary to communicate with the mobile station using the key K. The network element 40 may directly receive the hash value forming the distinguished key K from the authentication center rather than the above described distinguished authentication vector. Alternately, the network element could keep a database of $XRES_0$ and $Kc_0$ for different subscriber identities (e.g. the IMSI).

FIG. 4 is a signal flow diagram illustrating one embodiment of a bootstrapped method of authenticating a mobile subscriber using distinguished authentication data. Some of the procedures performed by the network elements according to the method illustrated in FIG. 4 are similar to the procedures performed according to the method illustrated in FIG. 2.

For authentication of the mobile station and generation of a session key, the network element 40 sends an authentication request to the mobile subscriber's mobile equipment 204 in a step 221, wherein the authentication request comprises only the random number challenge RAND, and the distinguished $RAND_0$ is not transmitted over the radio network from the network element 40 to the mobile station 202. In reference to FIG. 5, the authentication and session key generation process performed at the mobile station 202 begins in step 224 in which the mobile equipment 204 receives the authentication challenge with the challenge RAND. In a step 226, the secure IC 32 computes the authentication response SRES1 and the mobile equipment 204 sends the response to the network element 40. In a step 228, the secure IC computes a first key KEY1 using the stored secret key Ki and the challenge RAND. In a step 240, the secure IC 32 computes a second key KEY2 using the distinguished challenge $RAND_0$ stored at the mobile equipment 204 and the secret key Ki stored at the secure IC 32. In a step 244, the mobile equipment 204 computes a session key K from KEY1 and KEY2. This key may be used in future communications or transactions.

The authentication and key generation process performed at the secure IC 32 and mobile equipment 204 is illustrated in more detail in reference to the network element 40 in FIG. 6. In step 222, the network element 40 sends RAND to the mobile equipment 204. Upon receipt of the random number challenge RAND, the mobile equipment 204 sends RAND to the secure IC 32 in step 224. In step 226, the secure IC generates the authentication or signed response SRES using RAND and the secret key Ki 38, and the secure IC computes the cipher key Kc in step 228 using the RAND and the secret key Ki. The secure IC 32 sends both the authentication response SRES and the cipher key Kc to the mobile equipment 204 in a step 230, and the mobile equipment 204 transmits the authentication response SRES to the network element 40 in a step 232. The network element 40 compares the authentication response SRES from the mobile equipment 204 to the expected response XRES in the selected authentication vector in a step 234, similar to step 119 in FIG. 3.

In a step 236, the mobile equipment 204 sends the distinguished random challenge $RAND_0$ 206, stored at the mobile equipment 204, to the secure IC 32, which computes a distinguished authentication response $SRES_0$ based on the distinguished $RAND_0$ in step 238, similar to step 226, using the secret key Ki. The secure IC 32 also computes the distinguished cipher key $Kc_0$ in step 240 using the secret key Ki. The secure IC 32 then transmits the distinguished authentication response $SRES_0$ and distinguished cipher key $Kc_0$ to the mobile equipment 204 in a step 242. Thus, the same secure IC used in the authentication process of FIG. 3 can be used to generate the distinguished cipher key $Kc_0$ so according to the embodiment of the invention illustrated in FIG. 6.

In response to receipt of the distinguished authentication response $SRES_0$ and distinguished cipher key $Kc_0$, the mobile equipment 204 generates a distinguished session key K in step 244. In one embodiment, the distinguished key K is generated based on the cipher key Kc and authentication response SRES generated by the secure IC 32 in steps 226 and 228 using RAND, and the distinguished cipher key $Kc_0$ and distinguished authentication response $SRES_0$ generated by the secure IC 32 in steps 238 and 240 using $RAND_0$. The mobile equipment stores the distinguished key K in a step 246. With the distinguished key K stored at both the mobile equipment 204 and the network element 40, the key K can be used in future communications and transactions. In some embodiments, the mobile equipment 204 is configured to reject an authentication request including the distinguished RAND value to ensure that the signed response to the reserved RAND value is never sent over the wireless communication link and the resulting enciphering key Kc0 is not used to encrypt over the radio link.

Thus, according to the authentication and key generation process illustrated in FIGS. 4-6, a key K is agreed for use by applications, re-using the existing GSM SIM, Authentication Center, and interface between the mobile terminal and SIM, but the key is not exposed by security weaknesses in the GSM air interface.

In one embodiment, the mobile equipment 204 is configured to generate a distinguished authentication response DRES to replace the authentication response SRES for the authentication of the identity of the mobile station 202 to the network element 40. For example, the mobile equipment 204 may be configured to generate a distinguished key DRES based on XRES, XRES0, Kc, Kc0. In such an embodiment the network element 40 either receives an expected distinguished authentication response DRES which is generated at the authentication center 42, or the network element 40 is configured to generate the expected distinguished response DRES based on the received parameters SRES, SRES0, Kc and Kc0. The network element 40 is further configured to compare the distinguished authentication data DRES generated by the mobile equipment 204 to the expected distinguished response for authentication of the mobile station 202.

In some embodiments, the authentication and key generation process discussed in reference to FIGS. 4-6 further employs a bootstrapping function in the mobile stations' home network for bootstrapping the authentication and key generation process. The bootstrapped process may be used for authentication and key generation in connection with communication sessions requiring heightened security, such as between the mobile station and an e-commerce network application function. In such embodiments, the mobile station 202 performs the authentication and key generation process in connection with the bootstrapping function instead of the network element 40, wherein the bootstrapping function receives the authentication vectors and session key K from the authentication center 42. Following authentication of the mobile station, the bootstrapping function then sends the session key K to the e-commerce network application function for encrypting communications with the mobile station.

Figure 2:
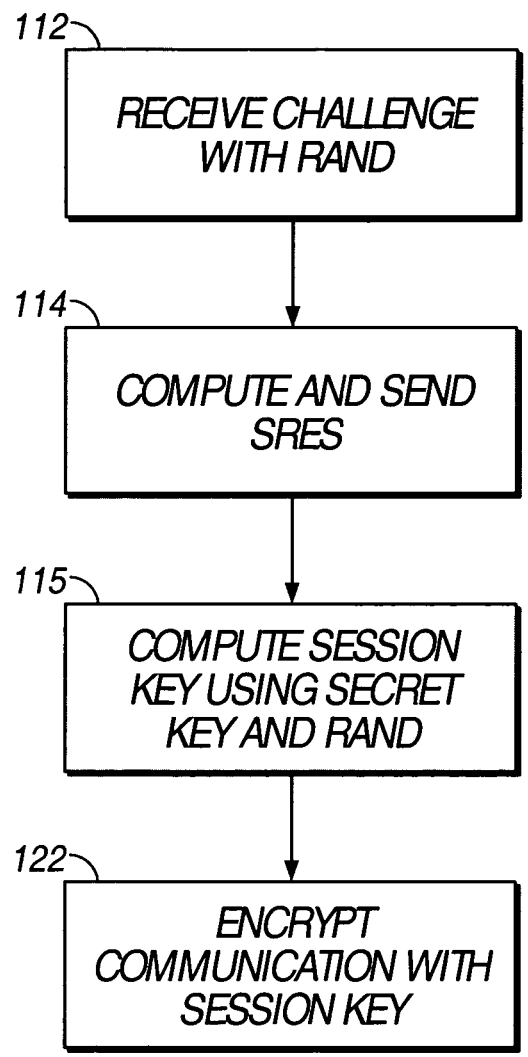
FIG. 2 is a flow chart illustrating an authentication and key generation process performed at a mobile station according to GSM.

In a communications network employing the bootstrapped process, the mobile equipment 204 may be configured to perform the authentication and key generation process with the secure IC 32 illustrated in FIGS. 2-3 for voice calls, wherein the cipher key Kc is used to encrypt communications with a network element. The mobile equipment 204 may further be configured to recognize a communication session type requiring increased security, such as e-commerce, and accordingly perform the authentication and key generation process with the secure IC 32 illustrated in FIGS. 5-6, wherein the session key K is used to encrypt communications. Regardless of the authentication and key generation process performed by the mobile equipment 204, the process performed by the secure IC 32 remains the same by receiving a random challenge and computing both a signed response and a cipher key based on the random challenge and the stored secret key Ki.

An exemplary implementation of the authentication and key generation process illustrated in FIGS. 4-6 is a communication session between a mobile station and a banking institution, wherein a mobile subscriber desires to exchange sensitive information with a network application and therefore desires increased communication security. In the present example, a mobile station requests communication with the bank network application function by transmitting a request to the bootstrapping function in the mobile station's home network. The bootstrapping function obtains standard (RAND, XRES, Kc) and distinguished authentication vectors (RAND$_0$, XRES$_0$, Kc$_0$) and a session key K from the authentication center for use in authenticating the identity of the mobile station requesting communication. The bootstrapping function sends the random challenge RAND to the mobile station's mobile equipment. The mobile equipment sends the random challenge RAND to its secure IC for computation of the response SRES and cipher key Kc. In response to receipt of the response SRES and cipher key Kc from the secure IC, the mobile equipment sends the response SRES to the bootstrapping function, which determines whether the key used to generate SRES is the same as the key used to generate the expected response XRES by comparing SRES to XRES. If the two parameters do match, the authentication of the mobile station is considered successful and the bootstrapping function sends the session key to the network application function (bank).

After sending the generated response SRES to the bootstrapping function, the mobile equipment sends the distinguished RAND$_0$, stored at the mobile equipment, to the secure IC for computation of the distinguished response SRES$_0$ and distinguished cipher key Kc$_0$. The mobile equipment then uses Kc, SRES, Kc$_0$, SRES$_0$ to compute the distinguished session key K. The mobile station and the network application function can then begin secure communications using the distinguished session key K to encrypt their communication transmissions.

As will be appreciated by those skilled in the art, the above-described systems and methods are directed to only a few specific embodiments, and the invention can be practiced in many ways. Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A mobile station for communicating in a wireless communications network, comprising:
    a receiver configured to receive at least one authentication data parameter forming a first challenge value from the wireless communications network;
    a memory configured to store a reserved challenge value, wherein the reserved challenge value is not transferred over a wireless communication link between the mobile station and the wireless communications network and is not used for initial authentication procedures;
    a first processing circuit configured to store a secret key, to generate a first key based on the at least one received authentication data parameter and the secret key, and to generate a second key based on the reserved challenge value and the secret key and independent of data received over the wireless communication link; and
    a second processing circuit configured to generate a third key, to use in the communication between the mobile station and the wireless communications network, using at least the first and second keys.

2. The mobile station of claim 1, wherein the second processing circuit is configured to encrypt communication transmissions using the third key.

3. The mobile station of claim 1, wherein the at least one received authentication data parameter comprises a random or pseudo-random number that changes for different communication sessions between the mobile station and the wireless communications network.

4. The mobile station of claim 3, wherein a mobile equipment in the mobile station is configured to reject an authentication request containing the reserved challenge value.

5. The mobile station of claim 1, wherein the first processing circuit is configured to generate an authentication response using the at least one received authentication data parameter and the secret key.

6. The mobile station of claim 5, wherein the mobile station is configured to send the authentication response over a wireless communication channel for authentication of the mobile station.

7. The mobile station of claim 1, wherein the first processing circuit comprises a secure integrated circuit.

8. The mobile station of claim 7, wherein the first processing circuit comprises a subscriber identity module (SIM).

9. A mobile element of a wireless communications network, the wireless communications network comprising a plurality of mobile elements and a plurality of network elements communicating with the mobile elements,
    wherein the mobile element is configured to authenticate itself to the wireless communications network by responding to a challenge value presented to the mobile element by a network element of the wireless communications network during a challenge response authentication procedure, and
    wherein the mobile element comprises a memory configured to store a reserved challenge value used in combination with a secret key stored in a secure integrated circuit to generate a key independent of data received over a wireless communication link between the mobile element and the network element, where the key is used in communication between the mobile element and a network element, wherein the reserved challenge value is not transferred over the wireless communication link between the mobile element and the network element and is not used for initial authentication procedures.

10. The mobile element of claim 9, wherein the secure integrated circuit is configured to generate sets of one or more keys in response to challenge values using at least the secret key.

11. The mobile element of claim 10, wherein the secure integrated circuit is configured to generate a signed response and an encryption key in response to the challenge value.

12. The mobile element of claim 11, wherein the secure integrated circuit comprises a subscriber identity module (SIM).

13. The mobile element of claim 12, wherein the mobile element is configured to communicate in a GSM communications network.

14. The mobile element of claim 12, wherein the mobile element is configured to communicate in a local area network.

15. A method of creating keys in a communication network that uses a challenge response authentication procedure, the method comprising:
    receiving at least one authentication challenge value, wherein the authentication challenge value is used in the challenge response authentication procedure;
    reserving at least one challenge value in a memory of a mobile unit, wherein the reserved challenge value is not used for initial authentication procedures and is not transferred over a wireless communication link between mobile units and network elements within the communication network; and
    generating session keys with the mobile unit to be used in communication between the mobile unit and network elements within the communication network, the session keys being generated using a first key and a second key, wherein the first key is generated by a secure integrated circuit based on the at least one authentication challenge value in combination with a secret key stored in the secure integrated circuit and the second key is generated by the secure integrated circuit based on the reserved challenge value in combination with the secret key and independent of data received over the wireless communication link.

16. A method of generating a key at a mobile station for securing communication between the mobile station and a network element, the method comprising:
    receiving a first challenge value as part of a challenge response authentication procedure from the network element at the mobile station;

sending the first challenge value to a secure integrated circuit;
generating a first key using at least the first challenge value and a secret key stored at the secure integrated circuit;
sending the first key to the network element for authentication;
sending a reserved challenge value to the secure integrated circuit, wherein the reserved challenge value is stored in a memory of the mobile station and is not transferred over a wireless communication link between the mobile station and the network element and is not used for initial authentication procedures;
generating a second key using at least the reserved challenge value and the secret key and independent of data received over the wireless communication link;
generating the key for secure communication using at least the first key and at least the second key.

17. The method of claim 16, wherein a value of the first key sent to a network element comprises a signed response (SRES).

18. The method of claim 16, wherein the first key comprises an encryption key.

19. The method of claim 16, wherein the second key comprises an encryption key.

20. The method of claim 16, further comprising generating, with the secure integrated circuit, a signed response and an encryption key for each authentication challenge value sent to a processing circuit.

21. The method of claim 16, wherein the first challenge value is a random or pseudo-random number.

22. A mobile station in a communications network, the mobile station comprising:
means for receiving an authentication challenge value as part of a challenge response authentication procedure from the communications network;
means for generating a first key using the received authentication challenge value and a secret key stored in a secure integrated circuit;
means for generating a second key in response to using the secret key and a distinguished authentication challenge value stored in a memory of the mobile station and independent of data received over a wireless communication link between the mobile station and the communications network, the distinguished authentication challenge value employed in generating keys to be used in communication between the mobile station and a network element, wherein the distinguished authentication challenge value is not transferred over the wireless communication link between the mobile station and the communications network and is not used for initial authentication procedures; and
means for generating a third key using at least the first key and at least the second key.

23. A non-transitory machine-readable medium comprising instructions for a mobile station for communicating in a wireless communications network, which when executed by at least one processor causes the at least one processor to:
receive at least one authentication data parameter forming a first challenge value from the wireless communications network;
generate a first key based on the at least one received authentication data parameter and a secret key that is stored in a first processing circuit;
generate a second key based on a reserved challenge value and the secret key and independent of data received over a wireless communications network between the mobile station and the wireless communications network, the reserved challenged value is stored in memory and is not transferred over the wireless communication link and is not used for initial authentication procedures; and
generate a third key, to use in the communication between the mobile station and the wireless communications network, using at least the first and second keys.

* * * * *